United States Patent [19]
Bedell

[11] Patent Number: 4,891,205
[45] Date of Patent: Jan. 2, 1990

[54] STABILIZED CHELATING AGENTS FOR REMOVING HYDROGEN SULFIDE

[75] Inventor: Stephen A. Bedell, Lake Jackson, Tex.

[73] Assignee: The Dow Chemical Company, Midland, Mich.

[21] Appl. No.: 831,969

[22] Filed: Feb. 24, 1986

[51] Int. Cl.$^4$ .............................................. C01B 17/05
[52] U.S. Cl. .................................. 423/576.6; 423/220
[58] Field of Search ................ 423/573 R, 220, 576.6; 556/2, 6; 252/189, 190, 191, 192

[56] References Cited

U.S. PATENT DOCUMENTS

| | | | |
|---|---|---|---|
| 3,622,273 | 11/1971 | Roberts et al. | 423/573 |
| 3,937,795 | 2/1976 | Hasebe | 423/573 R |
| 3,956,473 | 5/1976 | Mimoun et al. | 423/573 |
| 4,002,727 | 1/1977 | Sonoda et al. | 423/573 R |
| 4,009,251 | 2/1977 | Meuly | 423/573 |
| 4,083,945 | 4/1978 | Fenton et al. | 423/226 |
| 4,189,462 | 1/1980 | Thompson | 423/573 |
| 4,206,194 | 6/1980 | Fenton | 423/573 R |
| 4,220,505 | 9/1980 | Deem | 423/220 |
| 4,238,463 | 12/1980 | Nicksic | 423/226 |
| 4,243,648 | 1/1981 | Fenton | 423/573 R |
| 4,356,155 | 10/1982 | Blytas et al. | 423/226 |
| 4,382,918 | 5/1983 | Diaz | 423/573 |
| 4,388,293 | 6/1983 | Diaz | 423/573 |
| 4,400,368 | 8/1983 | Diaz | 423/573 |
| 4,421,733 | 12/1983 | Blytas | 423/573 |
| 4,431,616 | 2/1984 | Chou | 423/226 |
| 4,446,118 | 5/1984 | Nicksie | 423/226 |
| 4,455,287 | 6/1984 | Primack et al. | 423/573 |
| 4,461,754 | 7/1984 | Diaz | 423/573 |
| 4,515,759 | 5/1985 | Burnes et al. | 423/220 |
| 4,517,170 | 5/1985 | Klecka | 423/573 |
| 4,622,212 | 11/1986 | McManus et al. | 423/573 R |

FOREIGN PATENT DOCUMENTS 734,577  8/1955  United Kingdom,

OTHER PUBLICATIONS

Robert S. Caserio et al., Basic Principles of Organic Chemistry 2nd ed. 1977 pg. 650.

Primary Examiner—John Doll
Assistant Examiner—Jeffrey Edwin Russel
Attorney, Agent or Firm—Richard G. Waterman

[57] ABSTRACT

Soluble chemical compounds having a high affinity for hydroxyl radicals are effective stabilizers for chelating agents used in the hydrogen sulfide removal process. The stabilizers include aromatic compounds, bromide ions, iodide ions, cyanides, nitrites, amino acids, sugars, ascorbates, alcohols, polyols, aliphatic aldehydes, compounds having unsaturated carbon-carbon bonds, dimethyl sulfoxide, organic disulfides, alkyl amines, and formates. The aromatic compounds have the additional benefit of combining with hydroxyl radicals to form chelating agents.

9 Claims, No Drawings

STABILIZED CHELATING AGENTS FOR REMOVING HYDROGEN SULFIDE

FIELD OF THE INVENTION

The invention relates to the use of chelating agents to remove hydrogen sulfide from gas streams. Specifically, the invention relates to the use of stabilizers that increase the life of he chelating agents.

BACKGROUND OF THE INVENTION

The use of chelating agents to remove hydrogen sulfide from industrial gas streams is known in the art. A problem associated with this use of chelating agents is that most chelating agents are expensive and are degraded during the hydrogen sulfide removal process.

The useful life of a chelating agent solution can be extended by the addition of chemical compounds that retard the degradation of the chelating agents. Such compounds are called stabilizers and have generally been identified by experimentation. The use of stabilizers substantially improves the economics of the hydrogen sulfide removal process.

SUMMARY OF THE INVENTION

The present invention is the discovery that soluble chemical compounds having a high affinity for hydroxyl radicals are effective stabilizers for chelating agents used in the hydrogen sulfide removal process. The invention can be described as an aqueous solution for removing hydrogen sulfide from gas streams comprising metal ions in a concentration of at least about 100 ppm, a chelating agent in an amount at least equimolar to said metal ions, a buffering compound in a concentration sufficient to provide a pH between 4 and 11, and a stabilizer in an amount effective to retard degradation of the chelating agent, the stabilizer being selected from a group consisting of: water soluble aromatic compounds, bromide ions, iodide ions, cyanides, nitrites, amino acids, sugars, ascorbates, alcohols, polyols, aliphatic aldehydes, soluble organic compounds having unsaturated carbon-carbon bonds, dimethyl sulfoxide, organic disulfides, alkyl amines, and formates. The soluble aromatic compounds have the additional benefit of combining with hydroxyl radicals in the solution to form chelating agents that further prolong the useful life of the solution.

DETAILED DESCRIPTION OF THE INVENTION

The invention can be described as an aqueous solution for removing hydrogen sulfide from gas streams, comprising metal ions in a concentration of at least about 100 ppm, a chelating agent in an amount of at least equimolar to said metal ions, a buffering compound in a concentration sufficient to provide a pH between 4 and 11, and a stabilizer in an amount effective to retard degradation of the chelating agent, the stabilizer being selected from a group consisting of: water soluble aromatic compounds, bromide ions, iodide ions, cyanides, nitrites, amino acids, sugars, ascorbates, alcohols, polyols, aliphatic aldehydes, soluble organic compounds having unsaturated carbon-carbon bonds, dimethyl sulfoxide, organic disulfides, alkyl amines, and formates. The stabilizers of the present invention have a high affinity for hydroxyl radicals and it is believed that this affinity contributes to the effectiveness of the compounds as stabilizers.

Representative metal ions are chromium, cobalt, copper, iron, lead, manganese, mercury, molybdenum, nickel, palladium, platinum, tin, titanium, tungsten and vanadium. Of said metals, iron, copper and nickel are most advantageously employed.

The term "chelating agent" is well-known in the art and references are made thereto for the purposes of this invention. Chelating agents useful in the present invention include those chelating or complexing agents which form a water-soluble chelate with one or more of the afore-described metals. Representative of such chelating agents are the aminopolycarboxylic acids, including the salts thereof, nitrilotriacetic acid, N-hydroxyethyl aminodiacetic acid and the polyaminocarboxylic acids including ethylenediaminetetraacetic acid, N-hydroxyethylethylenediaminetriacetic acid, diethylenetriaminepentaacetic acid, cyclohexane diamine tetraacetic acid, triethylene tetraamine hexaacetic acid and the like; aminophosphonate acids such as ethylene diamine tetra(methylene phosphonic acid), aminotri(methylene phosphonic acid), diethylenetriamine penta(methylene phosphonic acid); phosphonic acids such as 1-hydroxy ethylidene-1,1-diphosphonic acid, 2-phosphono acetic acid, 2-phosphono propionic acid, and 1-phosphono ethane 1,2-dicarboxylic acid; polyhydroxy chelating agents such as monosaccharides and sugars (e.g., disaccharides such as sucrose, lactose and maltose) sugar acids (e.g., gluconic or glucoheptanoic acid); other polyhydric alcohols such as sorbitol and manitol; and the like. Of such chelating agents, the polyaminocarboxylic acids, particularly ethylenediaminetetraacetic and N-hydroxyethylethylenediaminetriacetic acids, and the nitrilotriacetic acid are most advantageously employed.

Most preferably, the metal chelate is the chelate of a ferric iron with ethylenediaminetetraacetic acid, N-hydroxyethylethylenediaminetriacetic acid, or nitrilotriacetic acid.

The process for the conversion of hydrogen sulfide to sulfur involves the use of the metal chelates, e.g. ferric chelates, as oxidizing agents. During the process, the metal ions are reduced to an inactive state and can be regenerated by oxidation to an active state. However, this recycling of metal chelates is limited by the loss of metal ions from solution as a result of degradation of the chelating agents that are complexed with the metal ions to form the metal chelates.

By this invention, it is established that the chelating agents used in the hydrogen sulfide removal process are significantly oxidized by hydroxyl radicals or some closely related oxygen species. Thus, compounds having a higher affinity for hydroxyl radicals than the chelating agents stabilize the chelating agent solution by preferentially combining with the hydroxyl radicals. Information concerning affinities for hydroxyl radicals was used to select potential stabilizers and was obtained from F. Ross and A. B. Ross, "Selected Specific Rates of Reactions of Transients From Water in Aqueous Solution. III. Hydroxyl Radical and Perhydroxyl Radical and Their Radical Ions," Nat. Stand. Ref. Data Ser., Nat. Bur. Stand. (U.S.), 59, Jan. 1977, PB - 263 198. The relative effectiveness of such stabilizers depends upon the relative affinity for hydroxyl radicals, the solubility of the compound in the metal chelate solution, and the concentration of the stabilizer.

The typical range for metal chelate solutions is generally a metal ion concentration greater than 100 parts per million with a chelating agent to metal ion molecular ratio of greater or equal to one. The preferred ranges are a metal ion concentration of 1,000 to 10,000 ppm and a chelating agent to metal ion molecular ratio of 1 to 10. The optimum amounts depend on the chelating agent used with a ratio of 1.0 to 1.2 being preferred for the polyaminocarboxylic acids and a ratio of 1.0 to 4.0 being preferred for the nitrilotriacetic acid. These solutions must be buffered to a pH of from about 4 to about 11, preferably from about 6 to about 9. The buffering agent is preferably used in a concentration in excess of the metal ion concentration.

Stabilizers for chelating agent solutions are generally effective in any concentration up to the limits of solubility, however, economics usually dictate a molar ratio of stabilizer to metal ion of from about 2 to about 100. Higher concentrations of stabilizers do not appreciably enhance performance and a molar ratio of from about 2 to about 5 is preferred.

The stabilizers of the present invention have a high affinity for hydroxyl radicals as previously mentioned and many have been shown effective by the examples below. The stabilizers are sacrificed during the $H_2S$ removal process in favor of a longer useful life for the metal chelates. However, the soluble aromatic compounds have an additional benefit when used as stabilizers because the addition of hydroxyl radicals to the aromatic compounds can form chelating agents capable of complexing with metal ions released by degraded chelating agents. Thus, such aromatic compounds can further retard the degradation of the original metal chelate solution by reducing the amount of free hydroxyl radicals in the solution and by later complexing with metal ions released by degraded chelating agents before the aromatic compounds are degraded by additional hydroxyl radicals.

The following examples are illustrative and explanatory of the present invention.

EXAMPLE I

A non-stabilized ferric chelate solution was prepared by mixing the following components:

| Item | Amount |
| --- | --- |
| Water | 1350 ml. |
| Ferric Chelate* | 150 ml. |
| $Na_2B_4O_7 \cdot 10H_2O$ | 71.5 grams |
| $K_2HBO_4$ | 65.3 grams |
| $KH_2PO_4$ | 51.0 grams |

*A 5 percent $Fe(NO_3)_3$ solution complexed with the trisodium salt of hydroxyethylethylenediamine-triacetic acid (HEDTA).

To this ferric chelate solution was added 0.75 moles of sodium benzoate as a stabilizer.

A gas mixture containing hydrogen sulfide was sparged through the stabilized ferric chelate solution for approximately twelve hours. The sparge gas consisted of air at 44 standard cubic feet per hour and of 5 percent hydrogen sulfide in nitrogen at 0.5 standard cubic feet per hour.

Following sparging, the ferric chelate solution was filtered and the filtrate quantitatively analyzed to determine the loss of the HEDTA (by determining the change in concentration of the trisodium salts). The filtered material was dried and quantitatively analyzed to determine the amount of sulfur recovered from the gas stream. Results are presented in a comparison Table for Example III below.

EXAMPLE II

A non-stabilized ferric chelate solution was prepared as done for Example I. To this solution was added 0.75 moles of paratoluene sulfonic acid and the solution was then sparged for twelve hours with the sparge gas of Example I. Results are also presented in the comparison Table for Example III below.

EXAMPLE III (Comparison)

A non-stabilized ferric chelate solution was prepared as done for Example I and sparged for twelve hours with the sparge gas of Example I without the addition of a stabilizer. The following Table demonstrates the effectiveness of the stabilizers of Examples I and II in comparison to the non-stabilized ferric chelate solution.

| Example | Additive | $Na_3$ HEDTA Degraded Per Sulphur Produced grams/gram |
| --- | --- | --- |
| 1 | Sodium Benzoate | 0.39 |
| 2 | Paratoluene Sulfonic Acid | 0.33 |
| 3 | None | 1.83 |

The preceding results demonstrate the effectiveness of soluble aromatic compounds for stabilization of metal chelate solutions. Although the run time of twelve hours is too short to quantitatively determine the benefit from conversion of the stabilizers to chelating agents, an analysis of the final sodium benzoate stabilized solution indicated the formation of salicylic acid and other hydroxylated benzoates. Such compounds would be effective chelating agents and should be formed in significant concentrations during the useful life of metal chelating solutions. Although not analyzed, the final paratoluene sulphonic acid stabilized solution is expected to have contained trace amounts of hydroxylated derivatives such as sulphonated cresols and methyl catechols which also should be effective chelating agents.

EXAMPLE IV

A non-stabilized ferric chelate solution was prepared as done for Example I. To this solution was added 0.75 moles of potassium iodide followed by sparging for twelve hours with the sparge gas of Example I. Results are presented in a comparison Table for Example VI below.

EXAMPLE V

A non-stabilized ferric chelate solution was prepared as for Example I. To this solution was added 0.75 moles of potassium bromide followed by sparging for twelve hours with the sparge gas of Example I. Results are presented in the comparison Table for Example VI below.

EXAMPLE VI (Comparison)

A non-stabilized ferric chelate solution was prepared as for Example I. To this solution was added 0.75 moles of potassium chloride followed by sparging for twelve hours with the sparge gas of Example I. In comparison to potassium iodide and potassium bromide, potassium chloride does not have a high affinity for hydroxyl radicals.

The results of Examples III through VII are presented for comparison in the following Table.

| Example | Additive | Na₃ HEDTA Degraded Per Sulfur Produced, Grams/Gram |
|---|---|---|
| 3 | None | 1.83 |
| 4 | KI | 0.51 |
| 5 | KBr | 0.43 |
| 6 | KCl | 1.72 |

The preceding results demonstrate the effectiveness of bromide and iodide ions as stabilizers for metal chelate solutions. The chloride ions, which do not have a high affinity for hydroxyl radicals, provided little stabilization. The sodium and ammonium salts of bromide and iodide are also expected to be suitable stabilizers based on these results.

EXAMPLE VII

A non-stabilized ferric chelate solution was prepared as for Example I. To this solution was added 0.75 moles of 2-propanol followed by sparging for twelve hours with the sparge gas of Example I. Results are presented in a comparison Table for Example IX below.

EXAMPLE VIII

A non-stabilized ferric chelate solution was prepared as for Example I. To this solution was added 0.75 moles of 1-butanol followed by sparging for twelve hours with the sparge gas of Example I. Results are presented in the comparison Table for Example IX below.

EXAMPLE IX

A non-stabilized ferric chelate solution was prepared as for Example I. To this solution was added 0.75 moles of ethylene glycol followed by sparging for twelve hours with the sparge gas of Example I. Results are presented in the following comparison Table which compares the results of Examples VII through IX with the results for the non-stabilized ferric chelate solution of Example III.

| Example | Additive | Na₃ HEDTA Degraded Per Sulphur Produced Grams/Gram |
|---|---|---|
| 3 | None | 1.83 |
| 7 | 2-Propanol | 0.74 |
| 8 | 1-Butanol | 0.51 |
| 9 | Ethylene Glycol | 0.89 |

The preceding results demonstrate the effectiveness of alcohols and polyols as stabilizers for metal chelate solutions. Based upon the measured effectiveness of ethylene glycol as a stabilizer, other polyols such as diethylene glycol methyl ether are expected to be effective stabilizers.

EXAMPLE X

A non-stabilized ferric chelate solution was prepared as for Example I. To this solution was added 0.75 moles of sodium formate followed by sparging for twelve hours with the sparge gas of Example I. Results are present in a comparison Table for Example XI below.

EXAMPLE XI

A non-stabilized ferric chelate solution was prepared as for Example I. To this solution was added 0.38 moles of sucrose followed by sparging for twelve hours with the sparge gas of Example I. Results are presented in the following comparison Table which compares the results for Examples X and XI with the results of the non-stabilized solution of Example III.

| Example | Additive | Na₃ HEDTA Degraded Per Sulphur Produced, Grams/Gram |
|---|---|---|
| 3 | None | 1.83 |
| 10 | Sodium Formate | 0.65 |
| 11 | Sucrose | 0.94 |

These results demonstrate the effectiveness of formates and sugars as stabilizers for metal chelate solutions. The potassium and ammonium salts of ferric acid are also expected to be suitable stabilizers based on these results.

EXAMPLE XII

A non-stabilized ferric chelate solution was prepared by mixing the following components:

| Item | Amount |
|---|---|
| Na₂B₄O₇.10H₂O | 104.9 grams |
| K₂HPO₄ | 95.8 grams |
| KH₂PO₄ | 220 ml. |
| Water | 2,200 ml. |
| Ferric Chelate* | 220 ml. |

* See note to Table for Example I

The pH of this solution was measured to be 7.7.

The preceding solution was sparged for twelve hours with a sparge gas consisting of 2.72 standard cubic foot per hour of air, 0.025 standard cubic foot per hour of hydrogen sulfide, 0.0012 standard cubic feet per hour of hydrogen cyanide and 0.12 standard cubic feet per hour of nitrogen, the nitrogen being used to carry the hydrogen sulfide and hydrogen cyanide. Liquid chromotography was used to monitor the change in the ferric chelate concentration. During the run, the solution was pumped through a filter to remove sulphur. Results are presented in a comparison Table for Example XIII below.

EXAMPLE XIII (Comparison)

A non-stabilized ferric chelate solution was prepared as for Example XII. This solution was sparged for twelve hours with a sparge gas consisting of 2.72 standard cubic foot per hour of air and 0.025 standard cubic foot per hour of hydrogen sulfide. The results of Examples XII and XIII are presented in the following Table.

| Example | Additive | Na₃ HEDTA Degraded Per Sulphur Produced, Grams/Gram |
|---|---|---|
| 12 | KCN | 0.75 |
| 13 | None | 0.98 |

The preceding Table demonstrates the effectiveness of cyanide as a stabilizer for metal chelate solutions.

All of the preceding Examples demonstrate that compounds having a high affinity for hydroxyl radicals are effective stabilizers for metal chelate solutions. Preferred compounds can be selected based upon solubilities, costs and relative effectiveness.

What is claimed is:

1. A method for removing hydrogen sulfide from gas streams, comprising the steps of:
   passing a gas containing hydrogen sulfide through a stabilized aqueous solution initially comprising:
   metal ions in a concentration of at least about 100 ppm;
   a chelating agent in an amount of at least equimolar to said metal ions;
   a buffering compound in a concentration sufficient to provide a pH between 4 and 11; and
   an inhibitor in a concentration sufficient to retard degradation of the chelating agents, the inhibitor being selected from a group consisting of iodide ions, bromide ions, nitrites, amino acids, alkyl amines, and combinations thereof;
   continuously oxidizing said sulfide to elemental sulfur while reducing said metal ions, a portion of the inhibitor combining with free hydroxyl radicals formed in the solution;
   removing said elemental sulfur from said solution; and
   oxidizing said metal ions with oxygen to regenerate the solution.

2. The method of claim 1, wherein the metal ion is iron.

3. A method for removing hydrogen sulfide from gas streams, comprising the steps of:
   passing a gas containing hydrogen sulfide through a stabilized aqueous solution initially comprising:
   metal ions in a concentration of at least about 100 ppm;
   a chelating agent in an amount at least equimolar to said metal ions;
   a buffering compound in a concentration sufficient to provide a pH between 4 and 11; and
   iodide ions in a molar concentration of at least two times greater than said metal ions;
   continuously oxidizing said sulfide to elemental sulfur while reducing said metal ions, a portion of the iodide ions combining with free hydroxyl radicals formed in the solution;
   removing said elemental sulfur from said solution; and
   oxidizing said metal ions with oxygen to regenerate the solution.

4. The method of claim 3, wherein the iodide ions are presented in the form of potassium iodide, sodium iodide or ammonium iodide.

5. The method of claim 4, wherein the metal ion is iron.

6. A method for removing hydrogen sulfide from gas streams, comprising of:
   passing a gas containing hydrogen sulfide through a stabilized aqueous solution initially comprising:
   metal ions in a concentration of at least about 100 ppm;
   a chelating agent in an amount at least equimolar to said metal ions;
   a buffering compound in a concentration sufficient to provide a pH between 4 and 11; and
   bromide ions in a molar concentration of at least two times greater than said metal ions;
   continuously oxidizing said sulfide to elemental sulfur while reducing said metal ions, a portion of the bromide ions combining with free hydroxyl radicals formed in the solution;
   removing said elemental sulfur from said from said solution; and
   oxidizing said metal ions with oxygen to regenerate the solution.

7. A method for removing hydrogen sulfide from gas streams, comprising:
   passing a gas containing hydrogen sulfide through a stabilized aqueous solution initially comprising:
   metal ions in a concentration of at least about 100 ppm;
   a chelating agent in an amount at least equimolar to said metal ions;
   a buffering compound in a concentration sufficient to provide a pH between 4 and 11; and
   bromide ions in a molar concentration of at least two times greater than said metal ions; wherein the bromide ions are presented in the form of potassium bromide, sodium bromide or ammonium bromide;
   continuously oxidizing said sulfide to elemental sulfur while reducing said metal ions, a portion of the bromide ions combining with free hydroxyl radicals formed in solution;
   removing said elemental sulfur from said solution; and
   oxidizing said metal ions to regenerate the solution.

8. The method of claim 7, wherein the metal ion is iron.

9. A method for removing hydrogen sulfide from gas streams, comprising the steps of:
   passing a gas containing hydrogen sulfide through a stabilized aqueous solution initially comprising:
   metal ions in a concentration of at least about 100 ppm;
   a chelating agent in an amount of at least equimolar to said metal ions;
   a buffering compound in a concentration sufficient to provide a pH between 4 and 11; and
   an aliphatic aldehyde in a molar concentration of at least 2 times greater than said metal ions;
   continuously oxidizing said sulfide to elemental sulfur while reducing said metal ions, a portion of the aliphatic aldehyde combining with free hydroxyl radicals formed in the solution;
   removing said elemental sulfur from said solution; and
   oxidizing said metal ions to regenerate the solution.

* * * * *